United States Patent
Khadri et al.

(10) Patent No.: US 9,001,990 B2
(45) Date of Patent: *Apr. 7, 2015

(54) METHODS, SYSTEMS, AND COMPUTER PROGRAM PRODUCTS FOR PROVIDING TELECOMMUNICATIONS SERVICES BETWEEN A SESSION INITIATION PROTOCOL (SIP) NETWORK AND A SIGNALING SYSTEM 7 (SS7) NETWORK

(71) Applicant: Tekelec, Inc., Morrisville, NC (US)

(72) Inventors: Seetharaman Khadri, Cary, NC (US); Robby Darren Benedyk, Angier, NC (US); Vikram Nair, New Dehli (IN)

(73) Assignee: Tekelec, Inc., Morrisville, NC (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/010,488

(22) Filed: Aug. 26, 2013

(65) Prior Publication Data

US 2014/0126428 A1     May 8, 2014

Related U.S. Application Data (63) Continuation of application No. 12/913,735, filed on Oct. 27, 2010, now Pat. No. 8,520,828, which is a continuation of application No. 11/085,620, filed on Mar. 21, 2005, now Pat. No. 7,856,094.

(51) Int. Cl.
*H04M 7/00* (2006.01)
*H04L 29/06* (2006.01)
(Continued)

(52) U.S. Cl.
CPC .............. *H04L 65/40* (2013.01); *H04M 7/127* (2013.01); *H04Q 3/0025* (2013.01); *H04Q 3/005* (2013.01);
(Continued)

(58) Field of Classification Search
USPC ................ 370/352; 379/207.02, 219, 221.08, 379/221.013
See application file for complete search history.

(56) References Cited

U.S. PATENT DOCUMENTS 4,191,860 A    3/1980   Weber
5,602,909 A    2/1997   Carkner et al.
(Continued)

FOREIGN PATENT DOCUMENTS

CN   ZL 200680017480.6    11/2011
CN   ZL 200780008487.6     4/2012
(Continued)

OTHER PUBLICATIONS

Decision to Grant a European Patent pursuant to Article 97(1) EPC for European Application No. 05725074.8 (Oct. 31, 2013).
(Continued)

*Primary Examiner* — Oleg Asanbayev
(74) *Attorney, Agent, or Firm* — Jenkins, Wilson, Taylor & Hunt, P.A.

(57) ABSTRACT

Methods, systems, and computer program products for providing telecommunication services between a SIP network and an SS7 network are disclosed. In one method, SIP/SS7 gateway receives an INVITE message from a SIP proxy server. The SIP/SS7 gateway extracts a called party number from the INVITE message and determines whether a telecommunications service is required and a type of service required for the INVITE message based on the called party number. The SIP/SS7 gateway then formulates an SS7 query to a database corresponding to the identified service type. The SIP/SS7 gateway receives a response from the database and uses data from the response to facilitate completion of the call. In one example, the SIP/SS7 gateway may forward a routing number extracted from the response back to the originating SIP proxy server. In another example, the SIP/SS7 gateway may generate a new INVITE message and forward the new INVITE message to a terminating SIP proxy server. In yet another example, the SIP/SS7 gateway may formulate a second query to the same database or to a different database to obtain further information for facilitate completion of the call.

11 Claims, 6 Drawing Sheets

(51) Int. Cl.
  *H04M 7/12* (2006.01)
  *H04Q 3/00* (2006.01)
  *H04M 3/42* (2006.01)
  *H04L 12/24* (2006.01)

(52) U.S. Cl.
  CPC .......... *H04L 65/1006* (2013.01); *H04L 65/104* (2013.01); *H04M 3/42297* (2013.01); *H04L 41/046* (2013.01); *H04L 41/0866* (2013.01); *H04M 2207/12* (2013.01); *H04Q 2213/13103* (2013.01); *H04Q 2213/13176* (2013.01); *H04Q 2213/13196* (2013.01); *H04Q 2213/13204* (2013.01); *H04Q 2213/13339* (2013.01); *H04Q 2213/13345* (2013.01); *H04Q 2213/13348* (2013.01); *H04Q 2213/13389* (2013.01)

(56) References Cited

U.S. PATENT DOCUMENTS

| | | |
|---|---|---|
| 5,650,998 A | 7/1997 | Angenot et al. |
| 5,671,225 A | 9/1997 | Hooper et al. |
| 5,838,683 A | 11/1998 | Corley et al. |
| 5,852,660 A | 12/1998 | Lindquist et al. |
| 6,002,693 A | 12/1999 | Hahn |
| 6,134,618 A | 10/2000 | Hebert |
| 6,145,120 A | 11/2000 | Highland |
| 6,160,883 A | 12/2000 | Jackson et al. |
| 6,167,129 A | 12/2000 | Fikis et al. |
| 6,182,086 B1 | 1/2001 | Lomet et al. |
| 6,249,572 B1 | 6/2001 | Brockman et al. |
| 6,311,323 B1 | 10/2001 | Shulman et al. |
| 6,327,267 B1 | 12/2001 | Valentine et al. |
| 6,396,840 B1 | 5/2002 | Rose et al. |
| 6,434,155 B1 | 8/2002 | Jones et al. |
| 6,578,187 B2 | 6/2003 | Yasuda |
| 6,611,584 B1 | 8/2003 | Khello et al. |
| 6,625,273 B1 | 9/2003 | Ashdown et al. |
| 6,639,981 B1 | 10/2003 | Dunn, Jr. et al. |
| 6,731,741 B1 | 5/2004 | Fourcand et al. |
| 6,748,585 B2 | 6/2004 | Proebsting et al. |
| 6,779,030 B1 | 8/2004 | Dugan et al. |
| 6,785,374 B2 | 8/2004 | Wang et al. |
| 6,795,546 B2 | 9/2004 | Delaney et al. |
| 6,944,666 B2 | 9/2005 | Belkin |
| 6,959,076 B2 | 10/2005 | Chang et al. |
| 7,286,545 B1 | 10/2007 | Tester et al. |
| 7,554,974 B2 | 6/2009 | Palmer et al. |
| 7,856,094 B2 | 12/2010 | Khadri et al. |
| 8,050,253 B2 | 11/2011 | Kalyanpur et al. |
| 8,059,667 B2 | 11/2011 | Lean et al. |
| 8,520,828 B2 | 8/2013 | Khadri et al. |
| 2001/0046285 A1 | 11/2001 | Park |
| 2001/0053218 A1 | 12/2001 | Leung et al. |
| 2002/0048360 A1 | 4/2002 | Zambre et al. |
| 2002/0054674 A1 | 5/2002 | Chang et al. |
| 2002/0059411 A1 | 5/2002 | Barnhouse et al. |
| 2002/0067818 A1 | 6/2002 | Barathan et al. |
| 2002/0163922 A1 | 11/2002 | Dooley et al. |
| 2002/0178262 A1 | 11/2002 | Bonnell et al. |
| 2002/0191768 A1 | 12/2002 | Stoughton |
| 2003/0037108 A1 | 2/2003 | Peiffer et al. |
| 2003/0050969 A1 | 3/2003 | Sant et al. |
| 2003/0231652 A1 | 12/2003 | Sprague et al. |
| 2003/0235285 A1 | 12/2003 | Marsico |
| 2004/0024894 A1 | 2/2004 | Osman et al. |
| 2004/0264671 A1 | 12/2004 | Lamberton et al. |
| 2005/0094623 A1 | 5/2005 | D'Eletto |
| 2005/0141528 A1 | 6/2005 | Matsuhashi et al. |
| 2006/0143517 A1 | 6/2006 | Douceur et al. |
| 2007/0086582 A1 | 4/2007 | Tai et al. |
| 2007/0168421 A1 | 7/2007 | Kalyanpur et al. |
| 2007/0206735 A1 | 9/2007 | Silver et al. |
| 2008/0181382 A1 | 7/2008 | Lean et al. |
| 2008/0209564 A1 | 8/2008 | Gayde et al. |
| 2008/0260119 A1 | 10/2008 | Marathe et al. |
| 2008/0285438 A1 | 11/2008 | Marathe et al. |
| 2010/0118866 A1 | 5/2010 | Cannon |

FOREIGN PATENT DOCUMENTS

| | | |
|---|---|---|
| EP | 1 217 816 A1 | 6/2002 |
| IN | 259716 | 3/2014 |
| KR | 1020030025024 A | 3/2003 |
| WO | WO 02/07456 A1 | 1/2002 |
| WO | WO 03/030429 A2 | 4/2003 |
| WO | WO 2007/081934 A2 | 7/2007 |
| WO | WO 2008/094648 A1 | 8/2008 |
| WO | WO 2008/130709 A2 | 10/2008 |

OTHER PUBLICATIONS

Communication under Rule 71(3) EPC for European Application No. 05 725 074.8 (Jun. 24, 2013).
Notice of Allowance and Fee(s) Due for U.S. Appl. No. 12/913,735 (Apr. 23, 2013).
First Examination Report for Indian Application No. 4068/CHENP/2008 (Feb. 26, 2013).
Supplemental Notice of Allowability for U.S. Appl. No. 12/913,735 (Jan. 11, 2013).
Notice of Allowance and Fee(s) Due for U.S. Appl. No. 12/913,735 (Nov. 16, 2012).
Extended European Search Report for European Application No. 07709644.4 (May 3, 2012).
Notice of Granting Patent Right for Invention for Chinese Patent Application No. 200780008487.6 (Nov. 25, 2011).
Notice of Allowance and Fee(s) Due for U.S. Appl. No. 12/023,601 (Aug. 24, 2011).
Second Office Action for Chinese Patent Application No. 200780008487.6 (Aug. 2, 2011).
Notice of Allowance and Fee(s) Due for U.S. Appl. No. 11/392,241 (Jul. 20, 2011).
Notice of Granting Patent Right for Invention for Chinese Patent Application No. 200680017480.6 (Jun. 27, 2011).
Notice of Abandonment for U.S. Appl. No. 12/106,869 (May 10, 2011).
Notice of Panel Decision from Pre-Appeal Brief Review for U.S. Appl. No. 11/392,241 (May 9, 2011).
Final Official Action for U.S. Appl. No. 12/023,601 (Feb. 16, 2011).
Non-Final Official Action for U.S. Appl. No. 12/106,807 (Feb. 15, 2011).
Communication under Rule 71(3) EPC for European Application No. 03 796 406.1 (Dec. 27, 2010).
Final Official Action for U.S. Appl. No. 11/392,241 (Dec. 7, 2010).
Final Official Action for U.S. Appl. No. 12/106,869 (Oct. 27, 2010).
Notice of Allowance and Fee(s) Due for U.S. Appl. No. 11/085,620 (Sep. 17, 2010).
Interview Summary for U.S. Appl. No. 11/392,241 (Sep. 9, 2010).
European Search Report for European Patent No. 1867115 (Sep. 3, 2010).
Non-Final Official Action for U.S. Appl. No. 12/106,807 (Aug. 5, 2010).
Non-Final Official Action for U.S. Appl. No. 12/023,601 (Jul. 7, 2010).
Non-Final Official Action for U.S. Appl. No. 11/392,241 (May 25, 2010).
Restriction and/or Election Requirement for U.S. Appl. No. 12/106,807 (Apr. 28, 2010).
Non-Final Official Action for U.S. Appl. No. 12/106,869 (Apr. 15, 2010).
Non-Final Official Action for U.S. Appl. No. 11/085,620 (Apr. 15, 2010).
Communication pursuant to Article 94(3) EPC for European Application No. 05 725 074.8 (Mar. 26, 2010).
Official Action for Chinese Patent Application No. 200680017480.6 (Mar. 18, 2010).
First Office Action for Chinese Patent Application No. 200780008487.6 (Mar. 12, 2010).

(56) References Cited

OTHER PUBLICATIONS

Summons to Attend Oral Proceedings Pursuant to Rule 115(1) EPC for European Patent No. 1568203 (Mar. 11, 2010).
Communication of European Publication Number and Information on the Application of Article 67(3) EPC for European Patent No. 2143230 (Dec. 16, 2009).
Supplementary European Search Report for European Patent No. 1738269 (Dec. 11, 2009).
Final Official Action for U.S. Appl. No. 11/085,620 (Jun. 19, 2009).
Interview Summary for U.S. Appl. No. 11/085,620 (Apr. 30, 2009).
Notice of Allowance and Fee(s) Due for U.S. Appl. No. 10/796,653 (Feb. 26, 2009).
Office Action for U.S. Appl. No. 11/085,620 (Dec. 19, 2008).
Notice of Panel Decision from Pre-Appeal Brief Review for U.S. Appl. No. 10/796,653 (Dec. 8, 2008).
Communication of European Publication Number and Information on the Application of Article 67(3) EPC for European Application No. 07 709 644.4 (Sep. 3, 2008).
Notification of Transmittal of the International Search Report and the Written Opinion of the International Searching Authority, or the Declaration for International Application No. PCT/US2008/005175 (Aug. 12, 2008).
Communication pursuant to Article 94(3) EPC for European Application No. 03 796 406.1 (Jun. 19, 2008).
Notification of Transmittal of the International Search Report and the Written Opinion of the International Searching Authority, or the Declaration for International Application No. PCT/US08/01285 (Jun. 2, 2008).
Office Action for U.S. Appl. No. 10/796,653 (Apr. 30, 2008).
Notification of European Publication Number and Information on the Application of Article 67(3) EPC for European Application No. 06 739 166.4 (Nov. 21, 2007).
Notification of Transmittal of the International Search Report and the Written Opinion of the International Searching Authority, or the Declaration for International Application No. PCT/US07/00492 (Oct. 19, 2007).
Notification of Transmittal of the International Search Report and the Written Opinion of the International Searching Authority, or the Declaration for International Application No. PCT/US06/10263 (Sep. 25, 2007).
Office Action for U.S. Appl. No. 10/796,653 (Oct. 2, 2007).
Communication pursuant to Article 96(2) EPC for European Application No. 03 796 406.1 (Sep. 28, 2006).
Notification of Transmittal of the International Search Report and Written Opinion of the International Searching Authority, or the Declaration for International Application No. PCT/US05/07712 (Jul. 25, 2006).
Supplementary European Search Report for European Application No. 03 796 406.1 (May 10, 2006).
"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).
Notification of European Publication Number and Information on the Application of Article 67(3) EPC for European Application No. 03 796 406.1 (Jul. 20, 2005).
Notification of Transmittal of the International Search Report or the Declaration for International Application No. PCT/US03/36520 (Jul. 6, 2004).
Notice of Allowance and Fee(s) Due for U.S. Appl. No. 10/294,400 (Apr. 28, 2004).
"INAP Feature Module," Cisco MGC Software Release 9.5(2), pp. 1-16 (Dec. 3, 2003).
"Tekelec Introduces TekWare™ IN and TekWare Mediation," Tekelec, p. 1 (May 28, 2003).
"Tekelec Announces Advanced Signaling Architecture—TekWare," Tekelec, pp. 1-3 (Jun. 4, 2002).
Marshall et al., "SIP Extensions for Supporting Distributed Call State," SIP Working Group, Internet Draft, pp. 1-12 (Aug. 2001).
Redmill, "An Introduction to SS7," Booktrout Technology, pp. 1-26 (Jul. 2001).
"Integrated Services Digital Network (ISDN); Signalling System No. 7 (SS7); ISDN User Part (ISUP) Version 4 for the International Interface; Part 1: Basic Services," European Telecommunications Standards Institute, ETSI EN 300 356-1, V4.2,1, pp. 1-44 (May 2001).
Crowe, "Cellular Network Perspectives," Wireless Review, pp. 1-4 (Mar. 2001).
Gurbani et al., "Accessing in services from SIP networks," Internet-Draft, pp. 1-20 (Feb. 2001).
"Interface Recommendation for Intelligent Network Capability Set 3: SCF-SSF Interface," ITU-T, Q.1238.2, pp. 7-9, 73-76, and 85-101 (Jun. 2000).
"Signalling System No. 7—ISDN User Part Functional Description," ITU-T, Q.762 (Dec. 1999).
"Signalling System No. 7—ISDN User Part Functional Description," ITU-T, Q.761 (Dec. 1999).
"Integrated Services Digital Network (ISDN); Signalling System No. 7; Signalling Connection Control Part (SCCP) (connectionless and connection-oriented) to Support International Interconnection; Part 1: Protocol Specification," European Telecommunications Standards Institute, ETSI EN 300 009-1, V1.4.2, pp. 1-18 (Nov. 1999).
Haerens, "Intelligent Network Application Part (INAP) Support of the SIP/SDP Architecture," SIP Working Group, Internet Draft, pp. 1-12 (Oct. 1999).
Liao et al., "SS7-TCAP/IP Interworking," Internet Engineering Task Force, pp. 1-14 (Mar. 1999).
Handley et al., "SIP: Session Initiation Protocol," Network Working Group, RFC 2543 (Mar. 1999).
"Eagle STP Platform," Tekelec, Publication 908-0126-01, Rev. A, pp. 1-4 (Copyright 1997).

METHODS, SYSTEMS, AND COMPUTER PROGRAM PRODUCTS FOR PROVIDING TELECOMMUNICATIONS SERVICES BETWEEN A SESSION INITIATION PROTOCOL (SIP) NETWORK AND A SIGNALING SYSTEM 7 (SS7) NETWORK

RELATED APPLICATIONS

This application is a continuation of U.S. patent application Ser. No. 12/913,735, filed Oct. 27, 2010, which is a continuation of U.S. patent application Ser. No. 11/085,620 (now U.S. Pat. No. 7,856,094), filed Mar. 21, 2005, the disclosure of which is incorporated herein by reference in its entirety.

TECHNICAL FIELD

The subject matter disclosed herein relates to providing inter-network telecommunications services. More particularly, the subject matter disclosed herein relates to methods, systems, and computer program products for providing telecommunications services between a session initiation protocol (SIP) network and a signaling system 7 (SS7) network.

BACKGROUND ART

Telecommunications networks currently utilize signaling system 7 (SS7) signaling protocol to effect the exchange of information used to provide advanced intelligent network (AIN) and intelligent network (IN) services, such as number portability (NP) service and toll-free calling service. Such services will be referred to herein as "telecommunications services." The data required to provide such telecommunications services may be stored in a service control point (SCP). A service may be invoked when a switch that originates a call determines that an IN or AIN trigger exists for the called party number, queries an SCP, and obtains a response including the requested information.

While such services are well developed in SS7 networks, such services have not been widely implemented in IP telephony networks, such as SIP networks. SS7 networks are not directly compatible with SIP networks because they each utilize different communications protocols. Communication between such networks may be necessary when a call originated by a SIP device in the SIP network requires information stored within the SS7 network.

One conventional method for retrieving telecommunications service information from an SS7 network for a SIP device is described in U.S. Pat. No. 6,785,374. The method includes sourcing a request for transaction capabilities application part (TCAP) information from a SIP proxy within a SIP network. This request is forwarded via a SIP message to an SS7/SIP signaling gateway to request that the SS7/SIP gateway formulate a TCAP query in the SS7 network. The request includes a SIP extension header that identifies the type of query being requested. In response to the request, the gateway transmits a TCAP message to an SCP within the SS7 network. The SCP then processes the request and returns a TCAP response to the SS7/SIP signaling gateway. The SS7/SIP gateway forwards the TCAP response to the originating SIP proxy.

One problem with such a technique is that it places the burden on the originating SIP proxy server of determining when to request a specific service from the SS7 network and identifying the service type. For example, in order to request LNP service, the SIP proxy server must be able to recognize that a called number has been ported. Similarly, in order to recognize a call that requires another service, such as toll free service, the SIP proxy server must include service logic that recognizes dialed toll free numbers.

Another problem with the method described in the '674 patent is that some calls may require multiple services, and the '674 patent fails to address this issue. For example, a call to an 800 number may result in the 800 number being translated into a routing number that requires number portability processing. Such a call would require the SIP proxy server to include service logic that recognizes the toll free number, the ported number, and that formulates two requests to the gateway for two different queries to the SS7 network. Requiring that SIP proxy server formulate two queries further increases the burden on the SIP proxy server. In addition, requiring that the SIP proxy server recognize and communicate the service request type to the SIP/SS7 gateway requires a non-standard SIP implementation and decreases the universal applicability of the gateway.

Accordingly, there exists a need for methods, systems, and computer program products for providing telecommunications services between a SIP network and an SS7 network in an efficient manner and that reduces the burden on SIP devices, such as SIP proxy servers.

SUMMARY

According to one aspect, the subject matter described herein comprises methods, systems, and computer program products for providing telecommunications services between a SIP network and an SS7 network. A method for providing such services may include receiving a signaling message relating to a call at a SIP/SS7 gateway. The signaling message may include a called party number. At the SIP/SS7 gateway, a telecommunications service required for the call may be identified based on the called party number. Once the service is identified, the SIP/SS7 gateway formulates a TCAP query and sends the TCAP query to the SS7 network. The SS7 network routes the TCAP query to the appropriate destination. The destination provides a TCAP response, which is forwarded from the SS7 network to the SIP/SS7 gateway.

The SIP/SS7 gateway may perform a variety of actions based on the TCAP response. For example, if the initial query is an 800 number query, the TCAP response may contain a routing number. If it is desirable to ensure that the routing number has not been ported or to translate the routing number if it has been ported, the SIP/SS7 gateway may automatically formulate an LNP query to the SS7 network and receive an LNP response. The SIP/SS7 gateway may then communicate the directory number obtained from the LNP query to the originating SIP proxy server and may also inform the SIP proxy server that an LNP lookup has been completed. Performing two queries in response to one SIP message reduces the traffic in the SIP network and reduces the burden on the SIP proxy server. In addition, informing the SIP proxy server that the LNP lookup has been performed further reduces the burden on the SIP proxy server.

In yet another alternate implementation, after the toll free and LNP queries have been performed, rather than forwarding the directory number to the originating SIP proxy so that the originating SIP proxy can complete the call, the SIP/SS7 gateway may originate a new INVITE message and forward the new INVITE message to the end office associated with the directory number obtained from the LNP or the routing number from 800 number lookup. Formulating the INVITE message rather than sending a REDIRECT message back to the originating SIP proxy further reduces traffic in the SIP network and also reduces the burden on the SIP proxy server.

The subject matter described herein may be implemented as a computer program product comprising computer executable instructions embodied in a computer readable medium. Exemplary computer readable media suitable for implementing the subject matter described herein include chip memory devices, disk storage devices, applications specific integrated circuits, and downloadable electrical signals.

BRIEF DESCRIPTION OF THE DRAWINGS

Preferred embodiments of the subject matter described herein will now be explained with reference to the accompanying drawings of which.

DETAILED DESCRIPTION

Methods, systems, and computer program products for providing telecommunications services signaling between a session initiation protocol (SIP) network and a signaling system 7 (SS7) network may be implemented in any suitable device having SIP and SS7 protocol capabilities. One example of a combination of hardware platforms suitable for implementing the methods, systems, and computer program products described herein is the Eagle® STP platform and the TekServer™ platform, both available from Tekelec of Calabasas, Calif. The Eagle® STP platform may implement the STP functionality described herein for delivering messages to SCPs in the SS7 network that provide telecommunications services, such as LNP, toll free, line information database (LIDB), CLASS, or other services. The TekServer™ platform may be used to implement the SIP/SS7 interworking functionality described herein.

Figure 1:
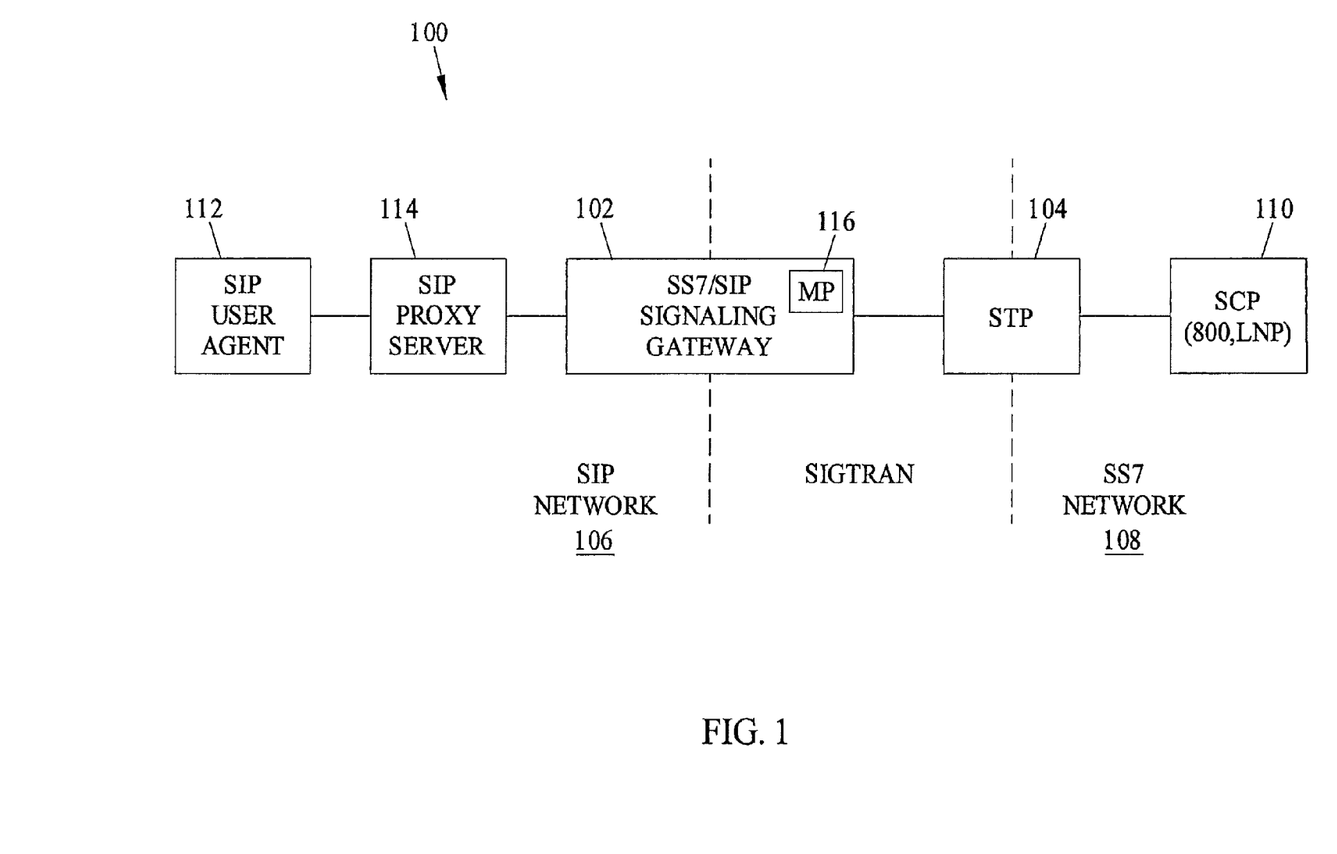
FIG. 1 is a schematic diagram of an exemplary distributed network communication system including a SIP/SS7 signaling gateway (SSG) and a signal transfer point (STP) for providing telecommunications services between a SIP network and an SS7 network according to an embodiment of the subject matter described herein.

FIG. 1 is a network diagram illustrating an exemplary network, generally designated 100, including an SS7/SIP signaling gateway (SSG) 102 and a signal transfer point (STP) 104 for enabling communication between a SIP network (generally designated 106) and an SS7 network (generally designated 108). SIP network 106 is connected to SS7 network 108 via SSG 102 and STP 104. SS7 network 108 may include one or more nodes, such as a service control point (SCP) 110, for storing telecommunications service information for SS7 network 108. The telecommunications service information may include information for providing toll-free calling, LNP, LIDB, CLASS, calling name (CNAM), or any other suitable service. Exemplary services that may be provided by SS7 network 108 will be described in detail below.

SIP network 106 may include one or more SIP devices, such as a user agent, a proxy server, and a redirect server. In FIG. 1 SIP network 106 includes a SIP user agent 112 and an SIP proxy server 114. SIP user agent 112 may be a SIP phone. SIP proxy server 114 implements standard SIP proxy server functions, such as signaling to establish sessions on behalf of user agent 112. According to one implementation of the subject matter described herein, SIP proxy server 114 is not required to determine whether queries to SS7 network are required for calls originated by SIP user agent 112. SIP proxy 114 may implement a standard version of SIP and simply forward calls initiated by user agent 112 to SSG 102. In such an implementation, SSG 102 appears as a SIP redirect server to SIP proxy 114. SSG 102 may determine whether a query is required, the type of query required and formulate the appropriate query to SS7 network 108. In an alternate implementation, SIP proxy server 114 may determine whether a query to SS7 network 108 is required and allow SSG 102 to identify the type of query required. Because SSG 102 is capable of identifying whether a query is required and/or the type query required in order to provide services for calls initiated in SIP network 100, proxy servers, such as SIP proxy server 114, can implement standard versions of the SIP protocol without requiring extension headers. If SSG 102 determines that a query is not required, SSG 102 may simply forward the call to its intended destination by formulating and sending the appropriate INVITE message to the destination.

In a typical call setup scenario SIP user agent 112 may send an INVITE message to SIP proxy server 114. In response, SIP proxy server 114 may formulate an INVITE message and send the INVITE message to SSG 102. SSG 102 may include a message processor (MP) 116 that receives the INVITE message determines whether a query is required and determines the type of service required. In one exemplary implementation, message processor 116 may identify whether a query is required and the service type based on the called party number contained in the "To" field of the SIP message and formulate a corresponding TCAP message. Message processor 116 may forward the TCAP message to STP 104. STP 104 routes the message to SCP 110. SCP 110 responds to the TCAP query by providing the requested service information and forwards the response back to message processor 116 via STP 104. Message processor 116 may formulate a SIP message that contains the service information and forward the SIP message to SIP proxy server 114. SIP proxy server 114 may then use the received information to complete the call. In an alternate implementation, message processor 116 may formulate a new INVITE message based on the response data and forward the new INVITE message to a SIP proxy server associated with the called party. Because the SIP proxy server is not required to determine whether a telecommunications service is being requested and/or the type of service being requested, the burden on SIP proxy server 114 is reduced over conventional SIP/SS7 interworking implementations.

Figure 2A:
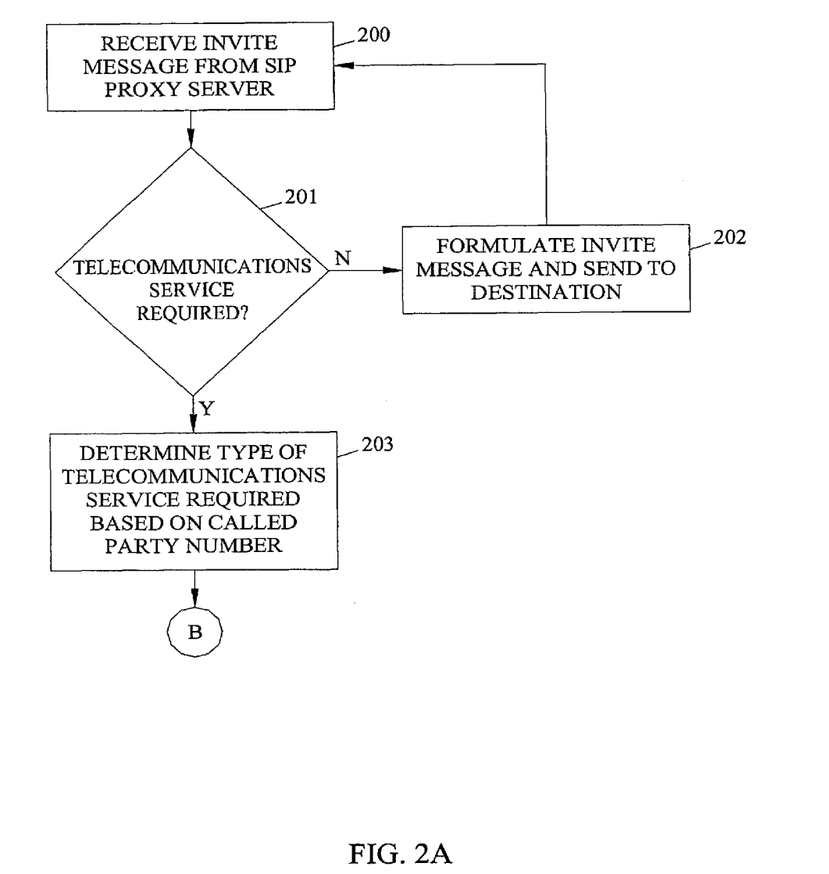
FIGS. 2A and 2B are a flow chart of an exemplary process for providing telecommunications services signaling between a SIP network and an SS7 network according to an embodiment of the subject matter described herein.
Figure 2B:
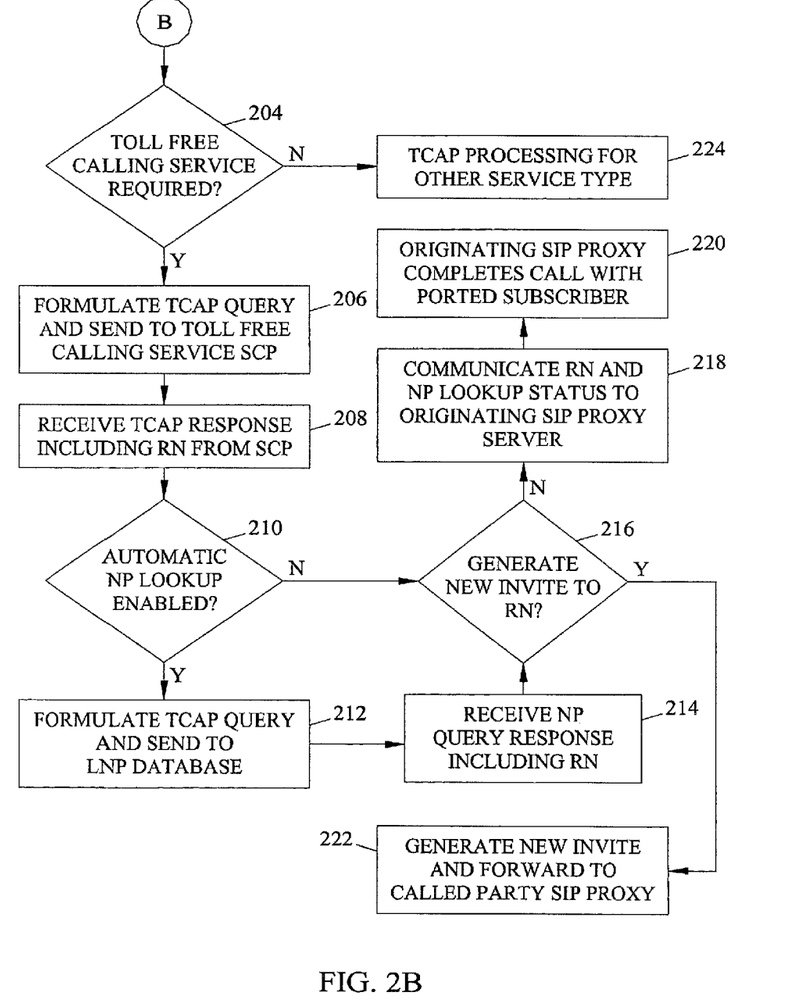

FIGS. 2A and 2B are a flow chart illustrating exemplary steps that may be performed by SSG 102 in automatically identifying and providing telecommunications services in response to a SIP INVITE message according to an embodiment of the subject matter described herein. Referring to FIG. 2A, in step 200, SSG 102 receives an INVITE message from a SIP proxy server. In step 201, SSG 102 determines whether a telecommunications service is required. Determining whether a telecommunications service is required may include analyzing the called party number in the "To" field of the INVITE message and determining whether any IN or AIN triggers have been defined for the number. If a telecommunications service is not required, control proceeds to step 202 where SSG 102 formulates an INVITE message and sends the message to the destination. The type of message formulated depends on whether the destination of the call is a SIP destination or an SS7 destination. If the destination is a SIP destination, an INVITE message will be formulated. In step 201, if it is determined that a telecommunications service is required, control proceeds to step 203 where SSG 102 determines the type of calling service required based on the called party number. The called party number may be extracted from the "To" field of the INVITE message. The service type may be identified based on the type of number. For example, toll free calls may be identified by called party numbers whose first three digits are 8xx, where x denotes zero, eight, or other digit used by telecommunications service provides to identify toll free calling services. Other service types may be identified by comparing the called party number to a database of called party numbers maintained by SSG 102 that correlates called party numbers with service types.

Referring to FIG. 2B, in step 204, if it is determined that toll free service is required, control proceeds to step 206 where SSG 102 formulates a TCAP query and sends the TCAP query to a toll free calling service SCP in the SS7 network. In step 208, SSG 112 receives a TCAP response including a routing number (RN) from the SCP. In one exemplary implementation, SSG 102 may simply forward the routing number to SIP proxy server 114 so that SIP proxy server 114 can complete the call. However, according to another aspect of the subject matter described herein, an automatic number portability lookup may be performed to determine whether the routing number has been ported. In step 210, it is determined whether automatic number portability lookup functionality is enabled. If automatic number portability lookup functionality is enabled, control proceeds to step 212 where SSG 102 formulates a TCAP query and sends the TCAP query to an LNP database in the SS7 network. In step 214, SSG 102 receives a number portability query response including a directory number corresponding to the routing number from the 800 number lookup.

Once the directory number is received or if automatic number portability lookup is not enabled, control proceeds to step 216 where it is determined whether SSG 102 is configured to generate a new INVITE to the called party SIP proxy corresponding to the RN. If the SSG is not configured to generate a new INVITE to the called party SIP proxy corresponding to the RN, control proceeds to step 218 where SSG 102 communicates the RN and the number portability lookup status to the originating SIP proxy server. Control then proceeds to step 220 where the originating SIP proxy server completes the call with the ported subscriber.

Returning to step 216, if SSG 102 is configured to generate a new INVITE message, control proceeds to step 222 where the SSG generates the new INVITE message and forwards the new INVITE message to the called party SIP proxy. Returning to step 204, if SSG 102 determines the toll free calling service is not required, control proceeds to step 224 where TCAP processing is performed for the other service type identified in step 202.

Thus, using the steps illustrated in FIGS. 2A and 2B, SSG 102 automatically identifies whether a telecommunications service is required, identifies the service type, and formulates the corresponding TCAP queries in response to an INVITE message from the SIP proxy server. Because the SIP proxy server is not required to send any non-standard SIP information to SSG 102 in order to identify the service type, SIP proxy server 114 can implement the standard SIP protocol without any extension headers. In addition, because two queries are performed in response to one message, the processing burden on the SIP proxy server is reduced.

Another important feature of the method illustrated in FIG. 2 is that SSG 102 can communicate number portability lookup status to the originating SIP proxy server. Yet another important feature of the method illustrated in FIG. 2 is that SSG 102 can generate a new INVITE message and signals to complete the call with the ported subscriber.

Figure 3:
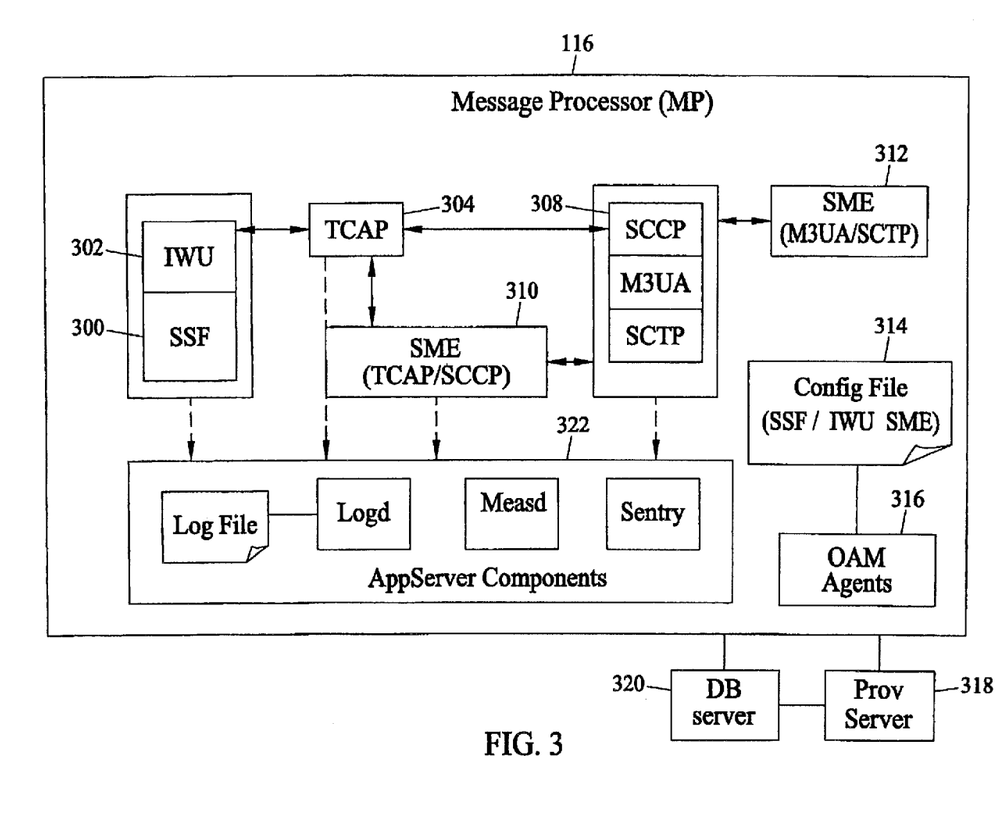
FIG. 3 is a schematic diagram of an exemplary message processor (MP) for providing SIP/SS7 interworking according to an embodiment of the subject matter described herein.

As stated above, the SIP/SS7 interworking functionality described herein may be implemented using one or more message processors within SSG 102. FIG. 3 is a block diagram illustrating an exemplary internal architecture of message processor 116 illustrated in FIG. 1. In FIG. 3, SIP server framework (SSF) 300 and interworking unit (IWU) 302 handle SIP messages from the SIP network, identify whether a telecommunications service is required for a SIP message, identify the type of service, and for messages for which a telecommunications service is required, forward the required information to and request query formulation from TCAP component 304. For INVITE messages for which a telecommunications service is not required, if the INVITE messages are for calls that terminate in the SS7 network, IWU 302 may generate a SIP 302 message back to SIP Proxy. If the INVITE message does not require a telecommunications service, and the call is destined for a SIP network, IWU 302 may forward the INVITE message to a called party SIP proxy server in the SIP network.

TCAP component 304 formulates the corresponding TCAP queries and forwards the TCAP queries to SS7 over IP protocol stack 308. SS7 over IP protocol stack 308 forwards TCAP queries to the SS7 network. For TCAP queries, protocol stack 308 may utilize SCCP, M3UA, SCTP, and IP layers. Although not illustrated in FIG. 3, message processor 116 may also include a standard SS7 protocol stack for sending and receiving SS7 messages over TDM-based SS7 links. In such an implementation, the M3UA and SCTP layers in protocol stack 308 would be replaced by MTP levels 1 through 3.

SME (TCAP/SCCP) 310 configures the TCAP and SCCP stack components. SME (M3UA/SCTP) 312 configures SS7 over IP stack 308. SMEs 310 and 312 read configuration files 314 to configure protocol stacks 306 and 308. Operations, administration, and maintenance (OAM) agents 316 create the configuration files for the software components of message processor 116. In particular, OAM agents 316 receive triggers from provisioning server 318 and extract configuration information from database server 320. OAM agents 316 create configuration files 314 and start the SSF/IWU, TCAP, SCCP/M3UA/SCTP, and SME processes. OAM agents 316 also verify consistency between configuration files and data stored on database server 320.

Application server components 322 log events generated by message processor 116. For example, application server components 322 may generate a log file that stores the alarm events. These functions may be performed by a logger daemon (logd). Application server components 322 may also include a measurements daemon (measd) that generates counts based on messages processed or generated by message processor 116. The sentry component of application server components 322 starts, stops, and restarts application server applications when it is determined that a particular application has failed.

Figure 4:
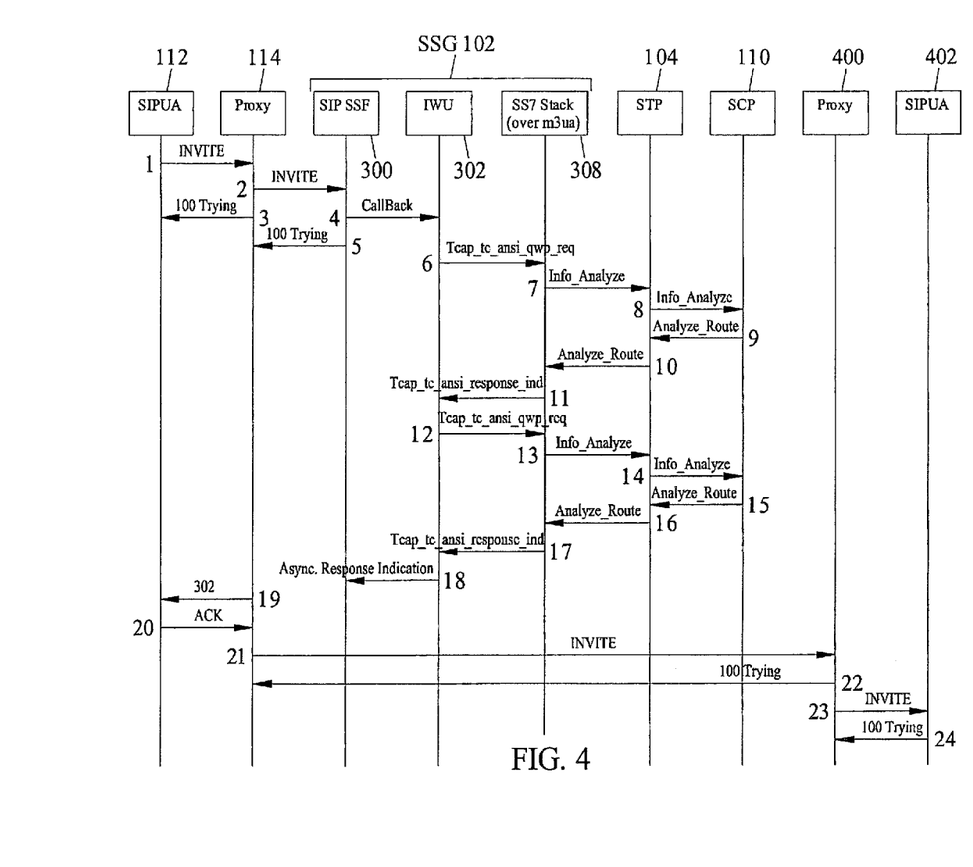
FIG. 4 is a message flow diagram illustrating an exemplary set of message exchanges for providing telecommunications services between a SIP network and an SS7 network according to an embodiment of the subject matter described herein.

FIG. 4 is a message flow diagram illustrating exemplary messages that may be exchanged between the SIP network and the SS7 network for a call that requires both toll free and LNP service. Referring to line 1 of the message flow diagram, SIP user agent 112 sends an INVITE message to SIP proxy server 114. The To header of the INVITE message may include the carrier identification code. In line 2 of the message flow diagram, proxy server 114 forwards the INVITE message to SSG 102. In line 3 of the message flow diagram, proxy 114 returns a SIP 100 Trying message to user agent 112.

In line 4 of the message flow diagram, SIP SSF 300 of SSG 102 sends a CallBack message to IWU 302. In line 5 of the message flow diagram, SIP SSF 300 returns a 100 Trying message to proxy 114 in response to the INVITE message of line 2.

In response to the CallBack message in line 4, in line 6 of the message flow diagram, IWU 302 identifies the message as requiring a toll free service, creates a new database context for maintaining mapping between SIP and TCAP transaction, and requests an AIN query for the toll free number. The toll free number may be extracted from the To field of the original SIP INVITE message. In line 7 of the message flow diagram, SSG 102 generates the TCAP query to STP 104. The query may be generated by TCAP component 304 illustrated in FIG. 3.

STP 104 performs global title translation to identify the point code and subsystem number of SCP 110. In line 8 of the message flow diagram, STP 104 forwards the TCAP query to SCP 110. In line 9 of the message flow diagram, SCP 110 returns a TCAP response to the TCAP query including the location routing number (LRN) corresponding to the toll free number. In line 10 of the message flow diagram, STP 104 forwards the response to SSG 102. Within SSG 102, the LRN is forwarded to IWU 302.

Rather than forwarding the LRN to proxy 114, in line 12 of the message flow diagram, if automatic LNP lookup functionally is enabled, IWU 302 requests an LNP query and forwards the request to SS7 stack 308. The request may include the LRN obtained from the toll free database response. In line 13 of the message flow diagram, SS7 stack 308 formulates and sends a TCAP message to STP 104. STP 104 forwards the TCAP message to SCP 110. In line 15 of the message flow diagram, SCP 110 determines the LRN corresponding to the received LRN and returns the ported-to LRN to SSG 102 via STP 104. Within SSG 104, in line 17 of the message flow diagram, the LRN is sent to IWU 302. In line 18 of the message flow diagram, the LRN is sent to SIP SSF 300.

In line 19 of the message flow diagram, SIP SSF 300 sends a 302 REDIRECT message to proxy 114. In line 20 of the message flow diagram, proxy 114 acknowledges the 302 REDIRECT message. In line 21 of the message flow diagram, proxy 114 sends and INVITE message to proxy server 400 associated with the LRN. In line 22 of the message flow diagram, proxy 400 returns a 100 TRYING message in response to the INVITE message. In line 23 of the message flow diagram, proxy 400 sends an INVITE message to the SIP user agent 402 associated with the called party. In line 24 of the message flow diagram, SIP user agent 402 responds with a 100 TRYING message indicating that the called party is being contacted. Thus, using the messages illustrated in FIG. 4, a toll free lookup and an LNP lookup are performed in response to a single INVITE message without requiring that the INVITE message include any non-standard SIP header information.

Figure 5:
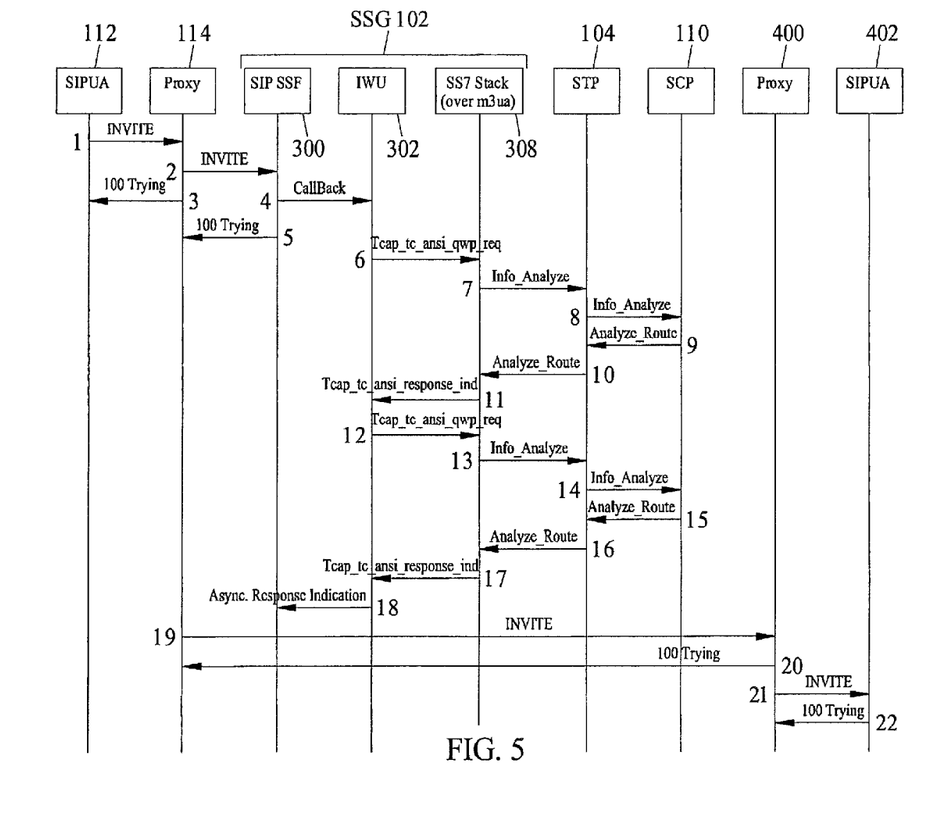
FIG. 5 is a message flow diagram illustrating an alternative set of exemplary message exchanges for providing telecommunications services between a SIP network and an SS7 network according to an embodiment of the subject matter described herein.

As stated above with regard to FIG. 2, rather than sending a REDIRECT message to the originating SIP proxy, SSG 102 may generate a new INVITE message and forward it to the called party SIP proxy. FIG. 5 illustrates exemplary messages that may be exchanged between SSG 102 and other entities in implementing such a feature. In FIG. 5, the messages in lines 1-18 are the same as the corresponding messages illustrated in FIG. 4. Hence, a description thereof will not be repeated herein. However, in line 19, rather than sending a REDIRECT message to proxy 114, SSF 300 sends an INVITE message to called party proxy 400. The INVITE message instructs called party proxy 400 to complete a call with proxy 114. The remaining lines FIG. 5 are the same as those in FIG. 4. Thus, by automatically generating a new INVITE message, the burden on the originating SIP proxy is further reduced.

Although in the examples described above, SSG 102 formulates TCAP queries and forwards the TCAP queries to an SCP in the SS7 network in order to obtain the information required to complete a call. However, the subject matter described herein is not limited to such an implementation. In an alternate implementation, the data needed to complete the call may be stored in the SSG or the STP. In an implementation in which the information required to complete the call is located in the SSG or the STP, a TCAP query to the SS7 network may not be required. For example, if the SSG receives an INVITE message that requires LNP service, the SSG may formulate a TCAP query to STP 104. In response to the TCAP query, STP 104 may perform a lookup in its internal LNP database and forward the response to SSG 102. STP 104 may perform similar lookups for other services for which STP 104 includes internal databases. Providing NP or other services at the STP for SIP originated calls reduces traffic in the SS7 network be eliminating the need for queries and responses to stand-alone SCP databases.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing telecommunications services in a session initiation protocol (SIP) and SS7 environment, the method comprising:
    at a SIP and SS7 gateway:
        (a) receiving a SIP INVITE message from a SIP network and relating to a call from an originating SIP proxy server, the SIP INVITE message including a called party number stored in a To field of the SIP INVITE message, wherein receiving a SIP INVITE message includes receiving a SIP INVITE message without any extension headers identifying the type of service required for the call, determining that a telecommunications service is required, and in response:
        (b) determining, based on the called party number from the SIP INVITE message, a type of telecommunications service required for the call, wherein determining a type of telecommunications service required for the call includes
            determining the type of telecommunications service by comparing the called party number to a database of called party numbers maintained by the SIP and SS7 gateway that correlates different called party numbers with a plurality of different service types;
        (c) formulating an SS7 query to a database in an SS7 network based on the identified type of service for the call;
        (d) receiving a response from the database to the query; and
        (e) extracting data from the response and using the data to facilitate completion of the call, wherein the SIP network and the SS7 network are incompatible with each other because the SIP network and the SS7 network use different communications protocols, wherein using the data extracted from the response to facilitate completion of the call includes performing a second query to the SS7 network using the data from the response and receiving a response to the second query; wherein using the data extracted from the response to facilitate completion of the call includes forwarding the data to the originating SIP proxy.

2. The method of claim 1 wherein using the data extracted from the response to facilitate completion of the call includes generating an INVITE message based on the data extracted from the response and forwarding the INVITE message to a terminating SIP proxy.

3. The method of claim 1 wherein the second query comprises a local number portability (LNP) query and wherein using the data from the response to facilitate completion of the call include extracting a directory number (DN) from the response to the LNP query and forwarding the DN to the originating SIP proxy server.

4. The method of claim 3 wherein forwarding the DN to the originating SIP proxy server includes indicating to the originating SIP proxy that a number portability database lookup has been performed.

5. The method of claim 1 comprising, in response to receiving the INVITE message, determining whether a telecommunications service is required and wherein performing steps (b)-(e) includes performing steps (b)-(e) only in response to determining that a telecommunications service is required.

6. The method of claim 5 comprising, in response to determining that a telecommunications service is not required, signaling to complete the call with a destination entity.

7. A session initiation protocol (SIP) and SS7 gateway comprising:
(a) a SIP interface for receiving a SIP INVITE message from a SIP network and relating to call from a SIP proxy server, the SIP INVITE message including a called party number stored in a To field of the SIP INVITE message;
(b) an interworking unit for determining a type of telecommunications service required for the call based on the called party number from the SIP message and for requesting a query based on the identified service type, wherein the interworking unit is adapted to determine whether a telecommunications service is required for the call, and, in response to determining that a telecommunications service is required for the call, the interworking unit is adapted to determine the service type based on the INVITE message without requiring an extension header identifying the service type to be present in the INVITE message, and wherein determining a type of telecommunications service required for the call includes one of:
determining the type of telecommunications service by comparing the called party number to a database of called party number maintained by the SIP and SS7 gateway that correlates different called party numbers with a plurality of different service types; and
(c) a database interface for receiving the request and for formulating an SS7 query to a database in an SS7 network and obtaining a response to the query, wherein the interworking unit is adapted to extract data from the response and use the data to facilitate completion of the call, wherein the SIP network and the SS7 network are incompatible with each other because the SIP network and the SS7 network use different communications protocols, wherein using the data extracted from the response to facilitate completion of the call includes performing a second query to the SS7 network using the data from the response and receiving a response to the second query; wherein using the data extracted from the response to facilitate completion of the call includes forwarding the data to the originating SIP proxy.

8. The SIP and SS7 gateway of claim 7 wherein the query comprises a number portability query and wherein the interworking unit is adapted to communicate a number portability lookup status indicating that a number portability lookup has been performed to the originating SIP proxy server.

9. The SIP and SS7 gateway of claim 7 wherein the query comprises a toll free query to obtain a first routing number and wherein the interworking unit is adapted to formulate a number portability query using the routing number extracted from the toll free query response.

10. The SIP and SS7 gateway of claim 7 wherein the interworking unit is adapted to generate a new INVITE message including the data extracted from the response and forward the new INVITE message to a terminating SIP proxy server.

11. A non-transitory computer-readable medium encoded with computer executable instructions that when executed by the processor of a computer control the computer to perform steps comprising:
at a session initiation protocol ISIPI and SS7 gateway:
(a) receiving a SIP INVITE message from a SIP network and relating to a call from an originating SIP proxy server, the SIP INVITE message including a called party number stored in a To field of the SIP INVITE message, wherein receiving a SIP INVITE message includes receiving a SIP INVITE message without any extension headers identifying the type of service required for the call, and, in response to receiving the INVITE message, determining whether a telecommunications service is required and, in response to determining that a telecommunications service is required:
(b) determining, based on the called party number from the SIP message, a type of telecommunications service required for the call, wherein determining a type of telecommunications service required for the call includes
determining the type of telecommunications service by comparing the called party number to a database of called party number maintained by the SIP and SS7 gateway that correlates different called party numbers with a plurality of different service types;
(c) formulating an SS7 query to a database in an SS7 network based on the identified type of service for the call;
(d) receiving a response from the database to the query; and
(e) extracting data from the response and using the data to facilitate completion of the call, wherein the SIP network and the SS7 network are incompatible with each other because the SIP network and the SS7 network use different communications protocols, wherein using the data extracted from the response to facilitate completion of the call includes performing a second query to the SS7 network using the data from the response and receiving a response to the second query; wherein using the data extracted from the response to facilitate completion of the call includes forwarding the data to the originating SIP proxy.

* * * * *